United States Patent
Holder et al.

(10) Patent No.: US 7,616,940 B2
(45) Date of Patent: Nov. 10, 2009

(54) STAND-ALONE LOW NOISE AMPLIFIER

(75) Inventors: Philip Holder, Bishops Stortford (GB); Graham Dolman, Ickleton (GB)

(73) Assignee: Nortel Network Limited, St. Laurent, Quebec (CA)

( * ) Notice: Subject to any disclaimer, the term of this patent is extended or adjusted under 35 U.S.C. 154(b) by 610 days.

(21) Appl. No.: 11/512,578

(22) Filed: Aug. 30, 2006

(65) Prior Publication Data

US 2007/0264934 A1 Nov. 15, 2007

Related U.S. Application Data

(60) Provisional application No. 60/799,084, filed on May 10, 2006.

(51) Int. Cl.
H04B 1/16 (2006.01)
(52) U.S. Cl. .......................... 455/341; 45/293; 45/291; 45/78; 370/294; 333/101
(58) Field of Classification Search ................. 455/341, 455/293, 291, 78, 80, 82, 83, 88; 370/294, 370/275, 280; 333/101, 100, 124
See application file for complete search history.

(56) References Cited

U.S. PATENT DOCUMENTS

| | | | | |
|---|---|---|---|---|
| 4,641,365 A | * | 2/1987 | Montini, Jr. | 455/78 |
| 4,855,691 A | * | 8/1989 | Argintaru et al. | 331/172 |
| 6,108,313 A | * | 8/2000 | Lee et al. | 370/294 |
| 6,226,275 B1 | * | 5/2001 | Yang et al. | 370/280 |
| 6,591,086 B1 | * | 7/2003 | Pleasant | 455/78 |
| 6,643,522 B1 | * | 11/2003 | Young | 455/552.1 |
| 7,373,115 B2 | * | 5/2008 | Monroe | 455/82 |
| 2005/0255810 A1 | * | 11/2005 | Monroe | 455/78 |
| 2006/0035601 A1 | * | 2/2006 | Seo | 455/78 |
| 2007/0111686 A1 | * | 5/2007 | Lee | 455/127.3 |
| 2009/0033547 A1 | * | 2/2009 | Kanto | 342/175 |

* cited by examiner

Primary Examiner—Minh D Dao
(74) Attorney, Agent, or Firm—Trop Pruner & Hu, P.C.

(57) ABSTRACT

A time division duplex (TDD) wireless apparatus includes a low noise amplifier (LNA) system, at least one antenna and a transceiver system. The apparatus supports N time division duplexed channels which each have a transmit direction of transmission flow and a receive direction of transmission flow. The LNA system comprises N sub-units. Each sub-unit comprises a first circulator for connecting to a respective TX/RX feed to the transceiver system and a second circulator for connecting to the at least one antenna. The first circulator and second circulator within each sub-unit are interconnected to provide a path in one of the directions of transmission flow. The first circulator of each sub-unit is connected to the second circulator of another sub-unit to provide a path in the other direction of transmission flow. A single channel variant is also provided.

15 Claims, 6 Drawing Sheets

US 7,616,940 B2

STAND-ALONE LOW NOISE AMPLIFIER

CROSS-REFERENCE TO RELATED APPLICATION

This claims the benefit under 35 U.S.C. § 119(e) of U.S. Provisional Application Ser. No. 60/799,084, filed May 10, 2006, which is hereby incorporated by reference.

FIELD OF THE INVENTION

The present invention relates to low noise amplifiers (LNA) used in wireless systems. It is in particular directed to low noise amplifiers used in Time Division Duplex (TDD) wireless systems.

BACKGROUND OF THE INVENTION

Low Noise Amplifier (LNA) systems are provided as part of base stations in wireless access networks and are typically positioned between the Base Transceiver System (BTS) of a base station and an antenna. Typically, the LNA system is positioned close to the antenna, at the top of an antenna mast or other supporting structure, and is called a Tower Mount Amplifier (TMA) or a Tower Top LNA (TTLNA). The main purpose of the LNA system is to amplify a received signal before forwarding the signal to a receiver in the BTS where the signal is demodulated and decoded.

Conventional LNA systems designed for Time Division Duplex (TDD) wireless systems or devices require either separate Transmit & Receive cables or require an additional control line/signal to switch between transmit and receive bursts as well as synchronization with the base station to perform the switching operation. In a Time Division Duplex (TDD) transmission scheme transmission and reception are performed in separate time periods. Examples of TDD transmission schemes are Worldwide Interoperability for Microwave Access (WIMAX) as defined in IEEE 802.16 and UMTS TDD.

FIG. 1 shows a first type of LNA system (TTLNA 20) with only one feeder cable 26 connecting the BTS 10 and TTLNA 20 which is used for both transmit and receive. Because a TDD transmission scheme will only transmit or receive a signal at any time (and will never simultaneously transmit and receive) the single feeder 26 can be used on a time-shared basis. A Tx/Rx switch 21 alternately connects the TX path 22 of the TTLNA 20 to the antenna 30, to convey a high-power signal for transmission, or connects the antenna 30 to the receive path 23 of the TTLNA 20 to convey a relatively low power received signal. Transmit/receive control signaling 27 is required between the base station BTS 10 and the Tx/Rx switch 21 of the TTLNA in order to implement switching between the receive and transmit signal paths at required times. This requires a standardised Tx/Rx signaling interface which can be difficult to realize where the LNA system 20 and base station 10 are supplied by different manufacturers. Furthermore, it is difficult to realize a Tx/Rx switch 21 which can switch at high power and with low loss. The transmit path 22 and receive path 23 are shown in FIG. 1 as being combined at the lowermost end by a circulator 25 although this could be replaced by another Tx/Rx switch, similar to switch 21, which is also under the control of signaling 27.

FIG. 2 shows another LNA system 40 which offers lower loss in transmit and receive paths as compared to the system of FIG. 1, at the expense of having two RF feeder cables 41, 42. One feeder cable 41 is dedicated to the transmit path and a second feeder cable 42 is dedicated to the receive path. This implies a high cost as well as some additional leasing and maintenance burden, and decreases the reliability of such systems.

It is an object of the present invention to provide an improved LNA system which mitigates the drawbacks of the above described LNA systems.

SUMMARY OF THE PRESENT INVENTION

A first aspect of the present invention provides a low noise amplifier (LNA) system for a time division duplex (TDD) wireless apparatus which comprises an antenna and a transceiver system. The LNA system comprises a first circulator having first, second and third ports. The first port is for connecting to a TX/RX feed to the transceiver system. A second circulator has first, second and third ports, the first port for connecting to the antenna. A transmit path extends between the second port of the first circulator and the third port of the second circulator. A receive path extends between the second port of the second circulator and the third port of the first circulator. The receive path comprises a limiter device and a low noise amplifier (LNA).

The use of circulators in the LNA system overcomes the need for transmit/receive switches. The LNA system has minimal attenuation during a transmit burst and the low noise amplifier in the receive path provides gain during the receive burst. The LNA system is completely stand-alone and operates independently of the base station. As the LNA system does not require a control from the base station this avoids the need to provide a standardized control interface between the transceiver system and the LNA system or to make any modification to the transceiver system. The limiter device in the receive path ensures that a high level of attenuation is applied to the receive path when the input signal exceeds a predetermined level, such as can occur when transmitted power leaks from the transmit path, through the second circulator, and into the receive path during a transmit phase of the TDD signal.

A further aspect of the present invention provides a low noise amplifier (LNA) system for a time division duplex (TDD) wireless apparatus. The wireless apparatus comprises at least one antenna and a transceiver system and supports N time division duplexed channels which each have a transmit direction of transmission flow and a receive direction of transmission flow. The LNA system comprises N sub-units, each sub-unit comprising a first circulator for connecting to a respective TX/RX feed to the transceiver system and a second circulator for connecting to the at least one antenna. The first circulator and second circulator within each sub-unit are interconnected to provide a path in one of the directions of transmission flow. The first circulator of each sub-unit is connected to the second circulator of another sub-unit to provide a path in the other direction of transmission flow. There are N paths in each direction of transmission flow in total and the paths which provide the receive direction of transmission flow comprise a low noise amplifier.

Interconnecting the first circulator of each sub-unit with the second circulator of another sub-unit has the effect of increasing the length of the loop around the LNA system. This reduces the loop gain and minimises inband ripple.

The N channels can be diverse with respect to one another. For example, with N=2, the two channels can comprise a main and a diversity channel.

It will be appreciated that each of the time division duplexed channels can be modulated according to any modulation scheme, or combination of modulation schemes, such as amplitude, phase, frequency or code-based modulation schemes. Each of the N channels can support communications with multiple users. In IEEE 802.16 time slots are allocated to users on a time-shared basis. Thus, on each channel, time slots in a transmit direction can be allocated to different users and, similarly, time slots in a receive direction can be allocated to different users.

While this invention is particularly advantageous when used as part of a wireless base station it can also be used with wireless terminals, especially terminals which transmit/receive multiple channels.

DESCRIPTION OF PREFERRED EMBODIMENTS

The present invention provides Low Noise Amplifier (LNA) systems particularly well suited for Time Division Duplex (TDD) wireless access networks, such as WIMAX or UMTS TDD access networks.

Figure 2:
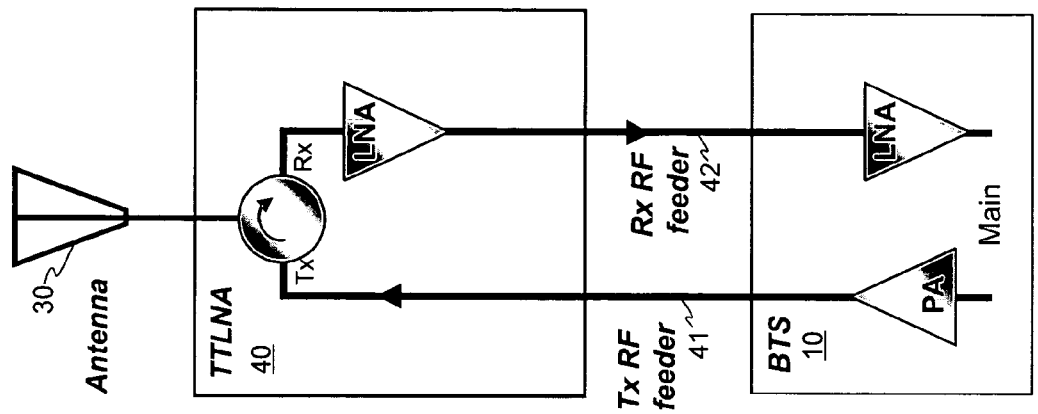
FIG. 2 shows of another LNA system.
Figure 1:
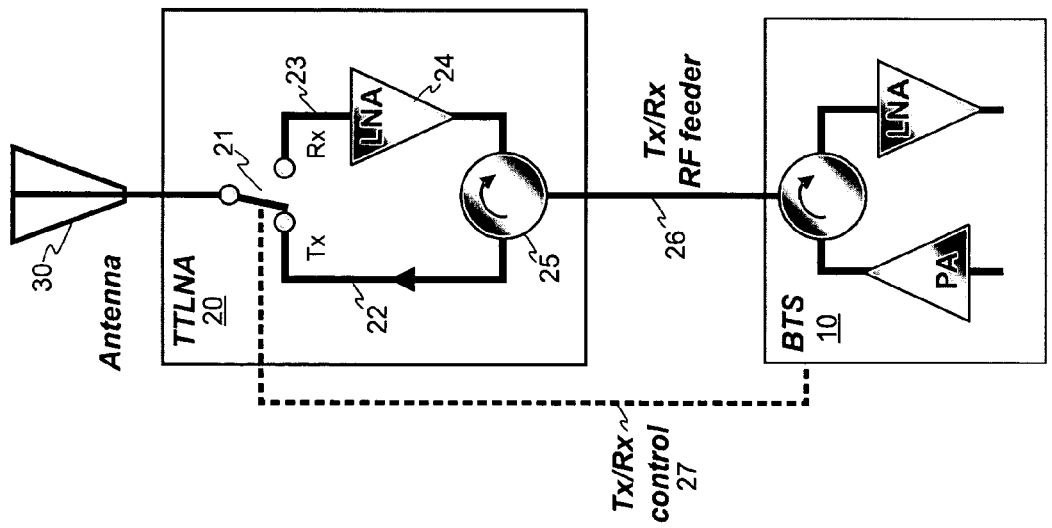
FIG. 1 shows a first LNA system.
Figure 3:
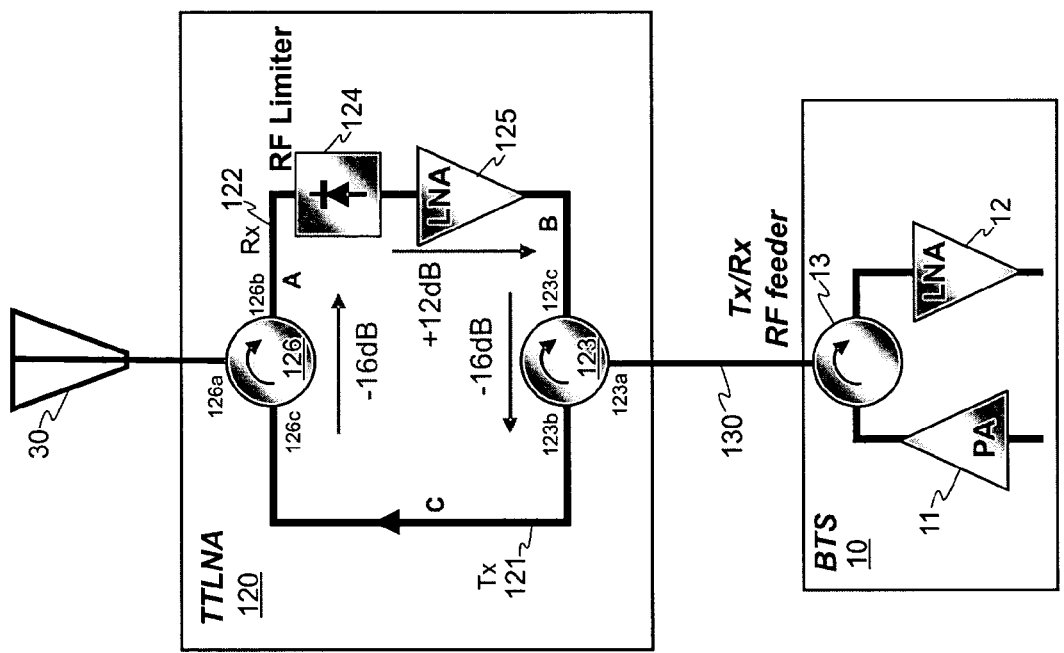
FIG. 3 shows an improved LNA system according to a first aspect of the present invention.

FIG. 3 shows a first embodiment of an improved LNA system in accordance with the invention. The improved LNA system 120 comprises two circulators 123, 126. A first circulator 123 connects a single Tx/Rx RF feeder cable 130 from the base station 10 to the LNA system 120. A second circulator 126 connects the LNA system 120 to the antenna 30. In this embodiment each circulator 123, 126 is a device having three ports. Power applied to a port is output from the next port, when viewed in the direction shown by the arrow on the circulator. Looking at circulator 123, a first port 123a is connected to the Tx/Rx RF feeder 130 which connects the base station to the LNA system, the second port 123b connects to the transmit path 121 and the third port 123c connects to the output of the receive path 122, downstream of the LNA module 125. At the second circulator 126, the first port 126a of the circulator 126 connects to a cable which feeds the antenna 30, the second port 126b feeds the receive path 122 and the third port 126c receives an input from the transmit path 121.

Figure 4:
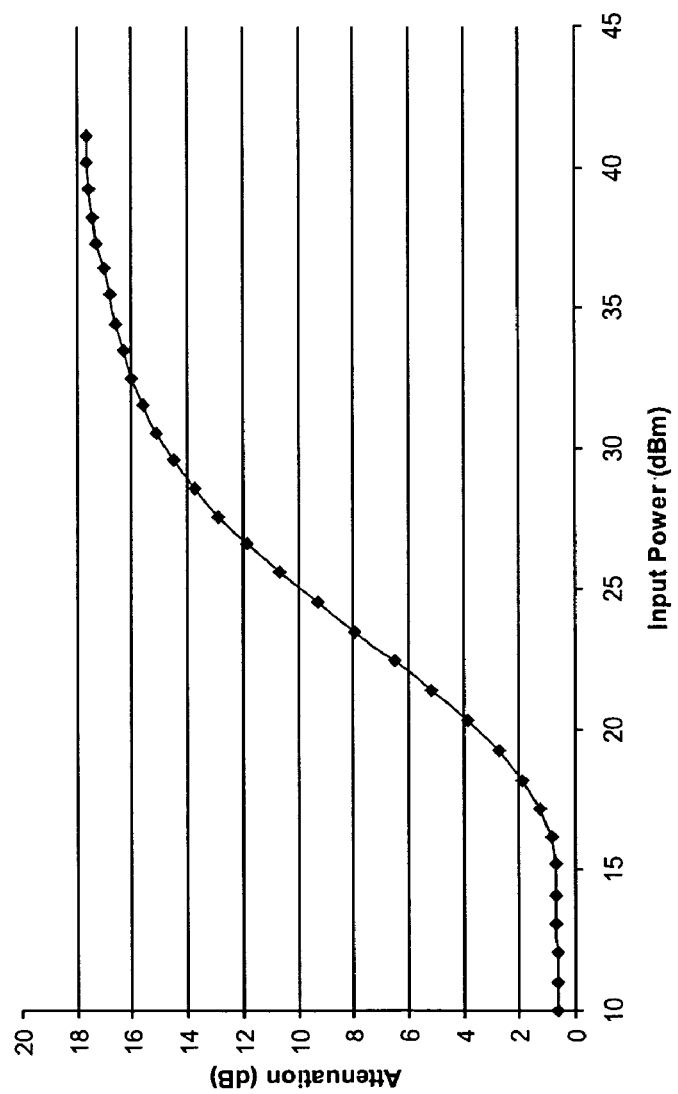
FIG. 4 shows an example attenuation response of the limiter used in the receive path of the LNA system of FIG. 3.

While a circulator should ideally convey all power applied at a first port to a second port, a practical realization of a circulator will also transmit some power to the third port (in the direction of movement around the circulator). Thus, looking at circulator 126, power is received at a first port 126c from the transmit path 121. The majority of the power applied at that first port is output at the second port 126a which feeds antenna 30. However, a small portion of the power applied at the first port will connect through to the next port 126b, which feeds the receive path 122. Therefore, during transmission of a high-power signal, some power will leak from the transmit path 121 (port 126c) to the receive path 122 (port 126b). As there is no Tx/Rx switch, this leaked power is free to flow around the loop as described. The receive signal path 122 also comprises an RF limiter 124 located upstream of the LNA module 125. The function of the limiter 124 is to attenuate leakage of the high transmit power into the receive path 122 and to prevent damage to the LNA module. Under low power conditions, as will exist during reception of a wanted receive signal, the limiter exhibits very low attenuation. FIG. 4 shows an example plot of the attenuation response of the RF limiter 124.

During a transmit burst of a TDD signal, power is routed from the power amplifier 11 of the base station 10, around circulator 13 to feeder 130 and on to the TTLNA 120. At the TTLNA 120, power is routed around circulator 123, along transmit path 121, around circulator 126 and on to antenna 30.

During a receive burst of a TDD signal, power is routed from the antenna to the TTLNA 120. Arriving at the TTLNA 120, power is routed around circulator 126, through the RF limiter 124 and LNA module 125, around circulator 126 and on to the base station 10. At the BTS 10 the power is routed around circulator 13 to a further LNA 12 and on to further receive path processing.

This improved LNA system is stand alone, as it does not require any transmit/receive synchronization from the base station. It comprises only one RF feeder cable 130 to/from the base station.

One potential limitation with the improved LNA system according to the first aspect of the invention is the relatively high loop gain internally around the LNA system which may result in an inband ripple level which is beyond requirements.

To illustrate the problem, FIG. 3 provides some example attenuation figures for devices around the loop. Each circulator 123, 126 exhibits a 16 dB isolation. This means that the isolation between a first port and the third port, in the order of circulation around the device, is 16 dB. Stated another way, the attenuation experienced by a signal when passing from one port to an unwanted port is 16 dB. The LNA module 125 has a 12 dB gain. This results in a loop gain around path A, B, C and back to A of (+12−16−16)=−20 dB. An echo of 20 dB magnitude generates a 1.74 dB peak-to-peak ripple in the output signal.

Figure 5:
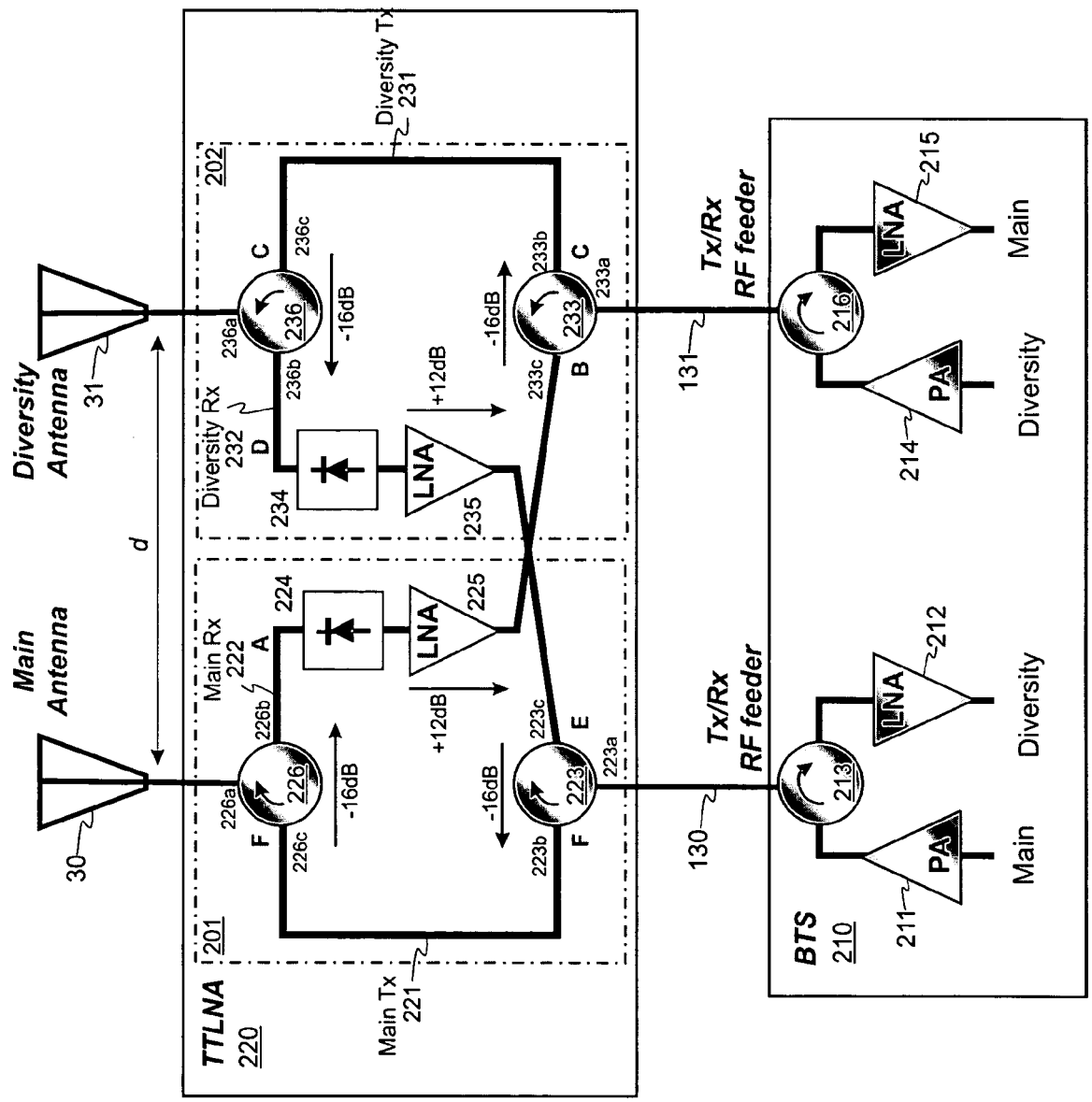
FIG. 5 shows a further improved LNA system having a main path and a single diversity path according to another aspect of the present invention.

In a second aspect, the present invention provides a further improved LNA system, an embodiment of which is illustrated in FIG. 5. FIG. 5 shows an improved LNA system 220 for use with a main channel and a diversity channel. Essentially, FIG. 5 comprises two sets 201, 202 of the equipment previously shown in FIG. 3 which are interconnected in a way that will reduce the loop gain in each of the receive paths. Each set of equipment shown in FIG. 3 will be called a sub-unit. BTS 210 has a power amplifier PA 211 and a LNA 215 for the main channel and a power amplifier PA 214 and a LNA 212 for the diversity channel. In this embodiment the main and diversity channels provide space diversity to the transmitted/received signals and so TTLNA 220 connects to a main antenna 30 and a diversity antenna 31 which are spaced apart by a suitable distance d to provide the required degree of diversity to the signals. In the first sub-unit 201, a first circulator 223 connects to a single Tx/Rx RF feeder cable 130 from the BTS 210 to the LNA system 220. A second circulator 226 connects the LNA system 220 to the antenna 30. As before, each circulator 223, 226 is a device having three ports and power applied to a port is output from the next port, when viewed in the direction shown by the arrow on the circulator. Looking at circulator 226, a first port 223a is connected to the Tx/Rx RF feeder 130 which connects the base station to the LNA system, the second port 223b connects to the main transmit path 221 and the third port 223c connects to the output of the diversity receive path 232. The second circulator 226 has a first port 226a which connects to a cable which feeds the antenna 30, a second port 226b feeds the main receive path 222 and a third port 226c which receives an input from the main transmit path 221.

In the second sub-unit 202, a first circulator 233 connects a single Tx/Rx RF feeder cable 131 from the base station 210 to the LNA system 220 and a second circulator 236 connects the LNA system 220 to the antenna 31. The third circulator 233 has a first port 233a which is connected to the Tx/Rx RF feeder 130 which connects the base station to the LNA system, a second port 233b connects to the diversity transmit path 231 and a third port 233c connects to the output of the main receive path 222. The fourth circulator 236 has a first port 236a which connects to a cable which feeds the antenna 31, a second port 236b which feeds the diversity receive path 232 and a third port 236c which receives an input from the diversity transmit path 231.

Summarising the above, each of the transmit paths 221, 231 is routed between circulators of the respective sub-units 201, 202. Each of the receive paths 222, 232 are connected between sub-units 201, 202 in a crossover configuration.

In operation, during a transmit burst of a TDD signal, power is routed from the main channel power amplifier 211 of the base station 210, around circulator 213 to feeder 130 and on to the TTLNA 220. At the TTLNA 220, power is routed around circulator 223, along transmit path 221, around circulator 226 and on to antenna 30. Similarly, power is routed from the diversity channel power amplifier 214 of the base station 210, around circulator 216 to feeder 131 and on to the TTLNA 220. At the TTLNA 220, power is routed around circulator 233, along transmit path 231, around circulator 236 and on to antenna 31.

During a receive burst of a TDD signal, power is routed from the antennas 30, 31 to the TTLNA 120. Considering first the main channel, arriving at the TTLNA 120, power is routed around circulator 226, through the RF limiter 224 and LNA module 225, around circulator 233 and on to BTS 210 via feeder 131. At the BTS 210 the power is routed around circulator 216 to LNA 215 and on to further receive path processing. Next, considering the diversity channel, arriving at the TTLNA 120, power is routed around circulator 236, through the RF limiter 234 and LNA module 235, around circulator 223 and on to BTS 210 via feeder 130. At the BTS 210 the power is routed around circulator 213 to LNA 212 and on to further receive path processing.

Because the receive paths 222, 232 are 'crossed over' a loop around the LNA 220 now comprises a longer path, shown as A-F. This reduces the loop gain and therefore the inband ripple. FIG. 5 provides some example attenuation figures for devices around the loop. Each circulator 223, 226, 233, 236 exhibits a 16 dB isolation and each LNA module has a 12 dB gain. Due to the crossover topology, the loop now comprises the path A to F. Starting at point A (port 226b of circulator 226), the loop passes through limiter 224, LNA 225, circulator 233 (port 233c to port 233b), path 231, circulator 236 (port 236c to 236b), limiter 234, LNA 235, circulator 223 (port 223c to 223b), main TX path 221 and circulator 226 (port 226c to 226b). The total loop gain is (+12−16−16+12−16−16)=−40 dB as any signal which propagates around the loop must now pass through four circulators. An echo of a 40 dB magnitude generates a 0.17 dB peak-to-peak ripple in the output signal, which is significantly less than that achieved in the embodiment previously with reference to FIG. 3, and will result in a lower Bit Error Rate (BER).

Figure 6:
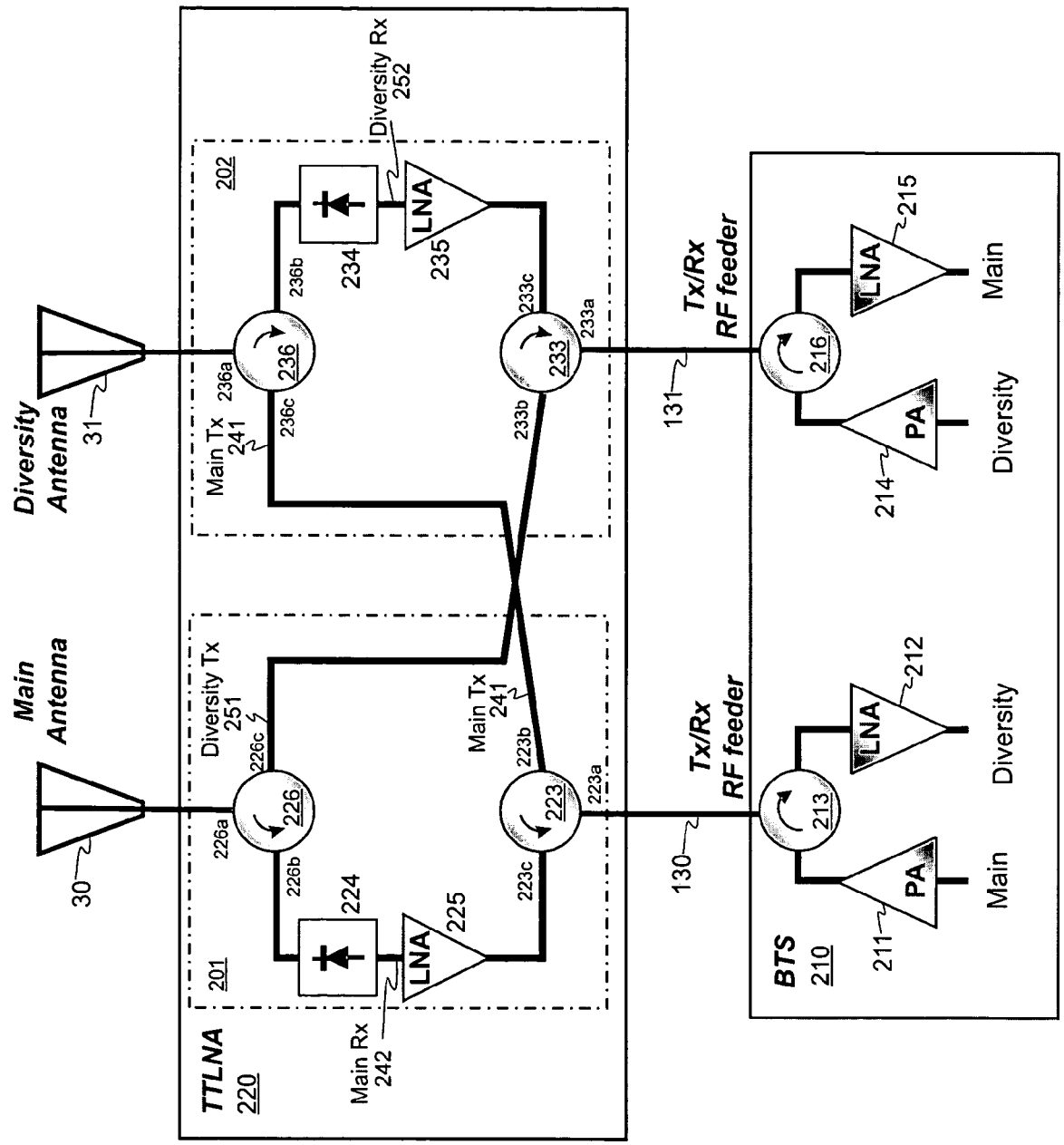
FIG. 6 shows an alternative form of the LNA system of FIG. 5.

In FIG. 5 each of the transmit paths 221, 231 is routed between circulators of the respective sub-units 201, 202 while the receive paths 222, 232 are connected between sub-units 201, 202 in a crossover configuration. The same advantage can be achieved by routing the receive paths between circulators of the respective sub-units 201, 202 while the transmit paths are connected between sub-units 201, 202 in a crossover configuration. FIG. 6 shows this alternative form of the LNA system. The main transmit path 241 is connected between circulator 223 of sub-unit 201 and circulator 236 of sub-unit 202. The diversity transmit path 251 is connected between circulator 233 of sub-unit 202 and circulator 226 of sub-unit 201. The main receive path 242 is connected between circulator 226 and circulator 223 of sub-unit 201. The diversity receive path 252 is connected between circulator 236 and circulator 233 of sub-unit 202.

Figure 7:
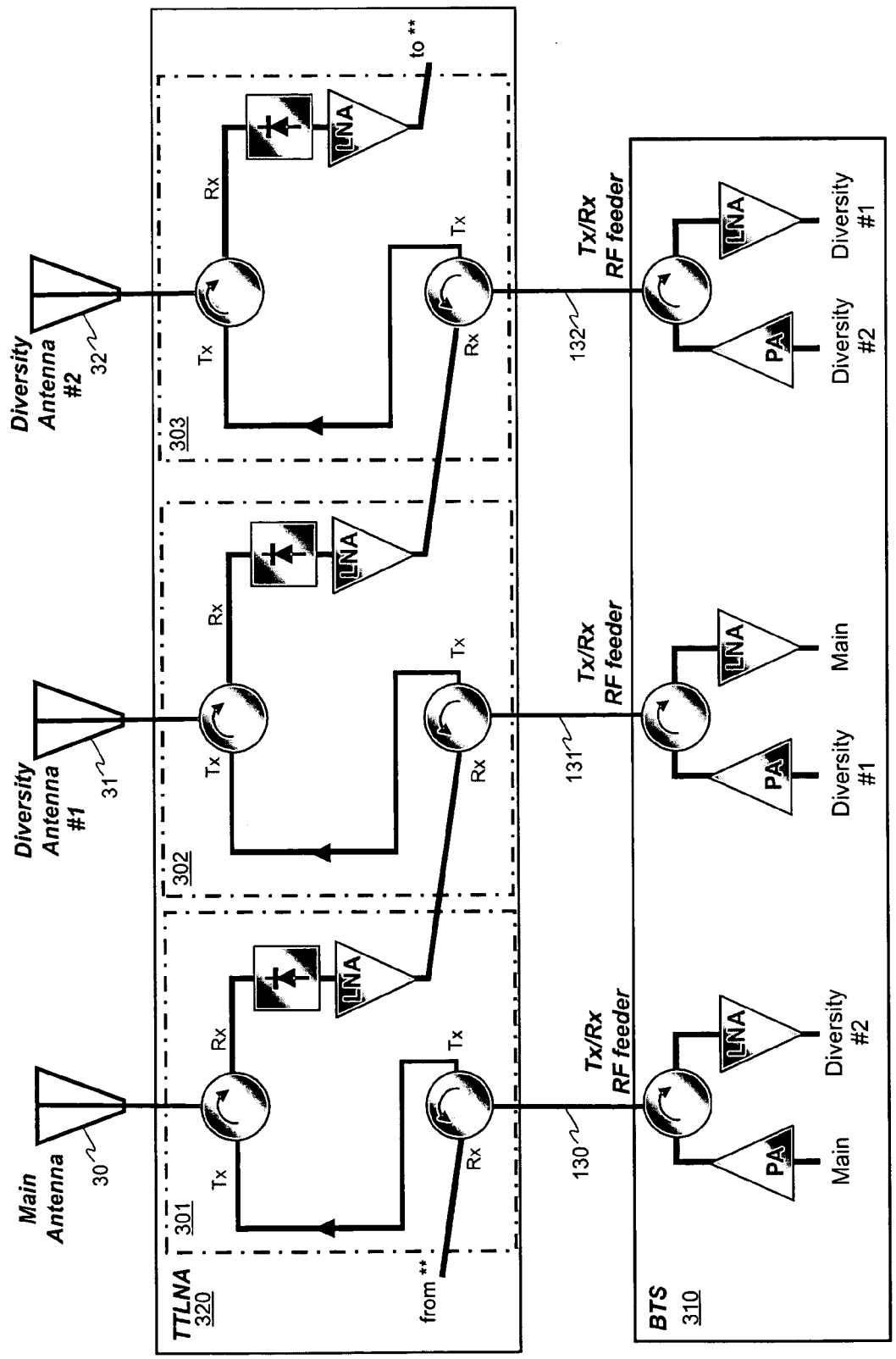
FIG. 7 is a diagram of a further improved LNA system having a main path and multiple diversity paths according to another aspect of the present invention; and,
FIG. 8 shows an antenna having two feeds which can be used in the system shown in any one of FIGS. 5-7.

FIGS. 5 and 6 show how the problem of loop gain can reduced in a two channel system. The crossover topology can be similarly applied to three (or more) channels. FIG. 7 shows a system with a main channel, a first diversity channel and a second diversity channel. As with FIG. 5, BTS 310 has a TX chain (PA) and a receive chain (LNA) for each channel. The TTLNA 320 has apparatus of the type shown in FIG. 3 for each channel (sub-units 301, 302, 303). In this embodiment, transmit paths are connected directly between circulators within each sub-unit 301, 302, 303. Receive paths are connected between adjacent sub-units in the same manner as described previously for FIG. 5. However, it is equally possible to route receive paths directly between circulators within each sub-unit 301, 302, 303 and to route transmit paths between adjacent sub-units. In this embodiment the loop comprises all three sub-units. It will be appreciated that the TTLNA system can be extended to any number of channels by adding additional sub-units. For each additional channel, BTS 320 requires a further TX chain, RX chain and circulator and a further TX/RX feeder is required.

In FIGS. 3 and 5-7 the BTS 10, 210, 310 is shown with a circulator 13, 213, 216 connecting the RF feeder to the PA and LNA. This can alternatively be replaced by a Tx/Rx switch under the local control of the BTS.

Figure 8:
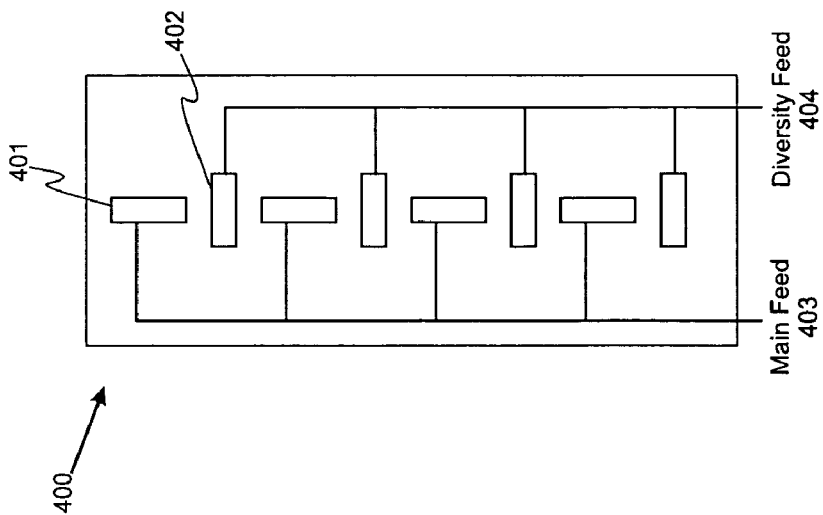

FIGS. 5-7 show examples where the form of diversity between the channels is space diversity. Each channel uses a dedicated antenna which is used to transmit/receive a signal at a position which is spaced from the antennas used for other channels. As an alternative to space diversity, the set of channels can be made diverse by use of polarisation diversity, angle diversity, frequency diversity, use of different channel codes (e.g. different spreading codes) or different modulation schemes. Diversity schemes can be combined so that, for example, a combination of space and frequency diversity can be used. In some cases the choice of diversity scheme will allow a common antenna 30 to be used for all of the channels. Thus, it is not essential that each circulator (226, 236 FIG. 5) is connected to a different antenna. As an example, the main signal can be vertically polarised and diversity signal can be horizontally polarised. FIG. 8 shows an antenna 400 having a feed 403 which connects to a set of vertical apertures 401 and a feed 404 which connects to a set of horizontal apertures 402. Antenna 400 is a common antenna which is shared by the main and diversity paths. It will be understood that the antenna 30 can comprise an array of antenna elements and beamforming apparatus which can form multiple beams of a desired shape and direction.

FIGS. 5-7 describe a system with a main signal and at least one diversity signal (i.e. two copies of the same signal) but the invention is not limited to this arrangement and can also be applied to apparatus which transmits or receives any two (or more) signals.

This further improved LNA system provided by the present invention automatically switches between transmit and receive modes. It provides minimal attenuation during the transmit burst and gain during the receive burst. It is completely stand-alone and operates independently of the base station, i.e. it requires no control from the base station or any base station modification.

We claim:

1. A low noise amplifier (LNA) system for a time division duplex (TDD) wireless apparatus, the wireless apparatus comprising at least one antenna and a transceiver system and supporting N time division duplexed channels which each have a transmit direction of transmission flow and a receive direction of transmission flow, the LNA system comprising:
    N sub-units, each sub-unit comprising a first circulator for connecting to a respective TX/RX feed to the transceiver system and a second circulator for connecting to the at least one antenna;
    wherein the first circulator and second circulator within each sub-unit are interconnected to provide a path in one of the directions of transmission flow and the first circulator of each sub-unit is connected to the second circulator of another sub-unit to provide a path in the other direction of transmission flow, there being N paths in each direction of transmission flow in total, and wherein the paths which provide the receive direction of transmission flow comprise a low noise amplifier.

2. A low noise amplifier system according to claim 1 wherein the paths which provide the receive direction of transmission flow further comprise a limiter device positioned upstream of the low noise amplifier in the direction of transmission flow.

3. A low noise amplifier system according to claim 1 wherein the N channels comprise a main channel and N−1 diversity channels.

4. A low noise amplifier system according to claim 1 wherein the first circulator and second circulator within each sub-unit are interconnected to provide a path in the transmit direction of transmission flow and the second circulator of each sub-unit is connected to the first circulator of another sub-unit to provide a path in the receive direction of transmission flow.

5. A low noise amplifier system according to claim 4 wherein:
    the first circulator in each sub-unit has first, second and third ports (in the direction of circulation), the first port for connecting to a first TX/RX feed to the transceiver system;
    the second circulator in each sub-unit has first, second and third ports (in the direction of circulation), the first port for connecting to the antenna;
    a path in the transmit direction of transmission flow extends between the second port of the first circulator and the third port of the second circulator, for each of the sub-units;
    a path in the receive direction of transmission flow extends between the second port of the second circulator in one sub-unit and the third port of the first circulator in a different sub-unit.

6. A low noise amplifier system according to claim 1 wherein the first circulator and second circulator within each sub-unit are interconnected to provide a path in the receive direction of transmission flow and the first circulator of each sub-unit is connected to the second circulator of another sub-unit to provide a path in the transmit direction of transmission flow.

7. A low noise amplifier system according to claim 6 wherein:
    the first circulator in each sub-unit has first, second and third ports (in the direction of circulation), the first port for connecting to a first TX/RX feed to the transceiver system;
    the second circulator in each sub-unit has first, second and third ports (in the direction of circulation), the first port for connecting to the antenna;
    a path in the receive direction of transmission flow extends between the second port of the second circulator and the third port of the first circulator, for each of the sub-units;
    a path in the transmit direction of transmission flow extends between the second port of the first circulator in one sub-unit and the third port of the second circulator in a different sub-unit.

8. A wireless apparatus comprising:
    at least one antenna;
    a transceiver system having N transceiver units, each transceiver unit supporting a time division duplexed channel having a transmit direction of transmission flow and a receive direction of transmission flow;
    a low noise amplifier (LNA) system according to claim 1; and
    a set of N RF feeders, each RF feeder connecting one of the transceiver units with a respective one of the sub-units within the LNA system.

9. A wireless apparatus according to claim 8 wherein the at least one antenna is arranged to provide N diverse channels, with the second circulator within each sub-unit of the LNA system connecting to a respective one of the N diverse channels.

10. A wireless apparatus according to claim 9 wherein the N diverse channels are diverse with respect to at least one of: space, angle and polarisation.

11. A wireless apparatus according to claim 9 wherein there are N antennas which are arranged to provide space diversity, with the second circulator within each sub-unit of the LNA system connecting to a respective one of the antennas.

12. A wireless apparatus according to claim 8 in the form of a wireless base station.

13. A wireless apparatus according to claim 8 in the form of a wireless terminal.

14. A method of processing signals at a low noise amplifier (LNA) system of a time division duplex (TDD) wireless apparatus, the wireless apparatus comprising at least one antenna and a transceiver system and supporting N time division duplexed channels which each have a transmit direction of transmission flow and a receive direction of transmission flow, the method comprising:
    processing signals at N sub-units, each sub-unit comprising a first circulator for connecting to a respective TX/RX feed to the transceiver system and a second circulator for connecting to the at least one antenna;
    providing a path in one of the directions of transmission flow by connecting the first circulator and second circulator within each sub-unit and providing a path in the other direction of transmission flow by connecting the first circulator of each sub-unit to the second circulator of another sub-unit, there being N paths in each direction of transmission flow in total, and amplifying signals in the receive direction of transmission flow in a low noise amplifier.

15. A low noise amplifier (LNA) system for a time division duplex (TDD) wireless apparatus, the wireless apparatus comprising an antenna and a transceiver system, the LNA system comprising:
 a first circulator having first, second and third ports, the first port for connecting to a TX/RX feed to the transceiver system;
 a second circulator having first, second and third ports, the first port for connecting to the antenna;
 a transmit path extending between the second port of the first circulator and the third port of the second circulator;
 a receive path extending between the second port of the second circulator and the third port of the first circulator, the receive path comprising a limiter device and a low noise amplifier (LNA).

* * * * *